United States Patent [19]

Britten

[11] 4,150,689
[45] Apr. 24, 1979

[54] CORE ROD CONSTRUCTION FOR BLOW-MOLDING APPARATUS

[76] Inventor: George C. Britten, 50 Beech St., Floral Park, N.Y. 11001

[21] Appl. No.: 525,391

[22] Filed: Nov. 20, 1974

Related U.S. Application Data

[63] Continuation of Ser. No. 327,005, Jan. 26, 1973, abandoned.

[51] Int. Cl.$^2$ .............................. F16K 1/44; B29C 5/06
[52] U.S. Cl. ....................................... 137/595; 425/535
[58] Field of Search ........... 425/DIG. 204, DIG. 206, 425/DIG. 209, DIG. 207, 242 B, 387 B, 535, 536, 522, 524, 538; 137/595

[56] References Cited
U.S. PATENT DOCUMENTS

| | | |
|---|---|---|
| 2,262,612 | 11/1941 | Kopitke ..................... 425/DIG. 209 |
| 2,348,738 | 5/1944 | Hofmann ..................... 425/DIG. 204 |
| 2,701,676 | 2/1955 | Day et al. .......................... 137/595 X |
| 3,116,877 | 1/1964 | Moslo ................................ 425/387 B |
| 3,183,552 | 5/1965 | Farkas ........................ 425/DIG. 209 |
| 3,227,182 | 1/1966 | Garman ............................ 137/595 X |
| 3,280,236 | 10/1966 | Ninneman et al. ........ 425/DIG. 209 |
| 3,305,890 | 2/1967 | Senior et al. .............. 425/DIG. 208 |
| 3,412,186 | 11/1968 | Piotrowski ................. 425/DIG. 209 |
| 3,470,282 | 9/1969 | Scalora ....................... 425/DIG. 204 |
| 3,523,330 | 8/1970 | Gallay ......................... 425/DIG. 207 |
| 3,523,401 | 8/1970 | Hansen ....................... 425/DIG. 207 |
| 3,609,803 | 10/1971 | Fattori ........................ 425/DIG. 209 |
| 3,842,149 | 10/1974 | Vollers ....................... 425/DIG. 209 |

Primary Examiner—William R. Briggs
Attorney, Agent, or Firm—Lackenbach, Lilling & Siegel

[57] ABSTRACT

A mounting sleeve having at one end a parison forming extension, and a stem shiftable within the sleeve and extension to open and close the same to passing fluid.

4 Claims, 12 Drawing Figures

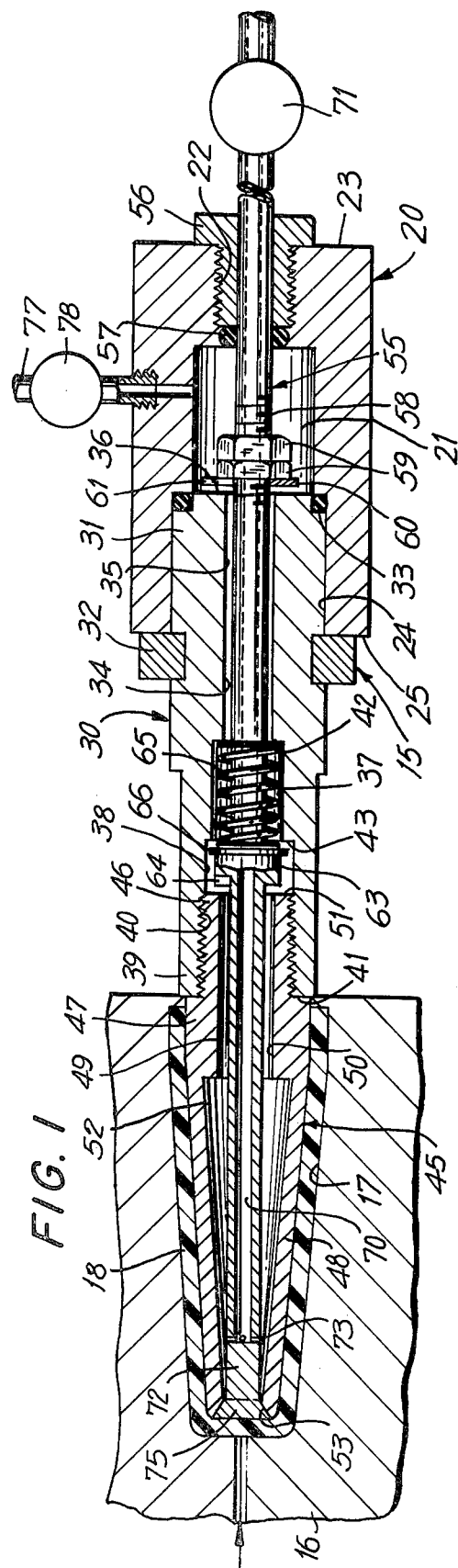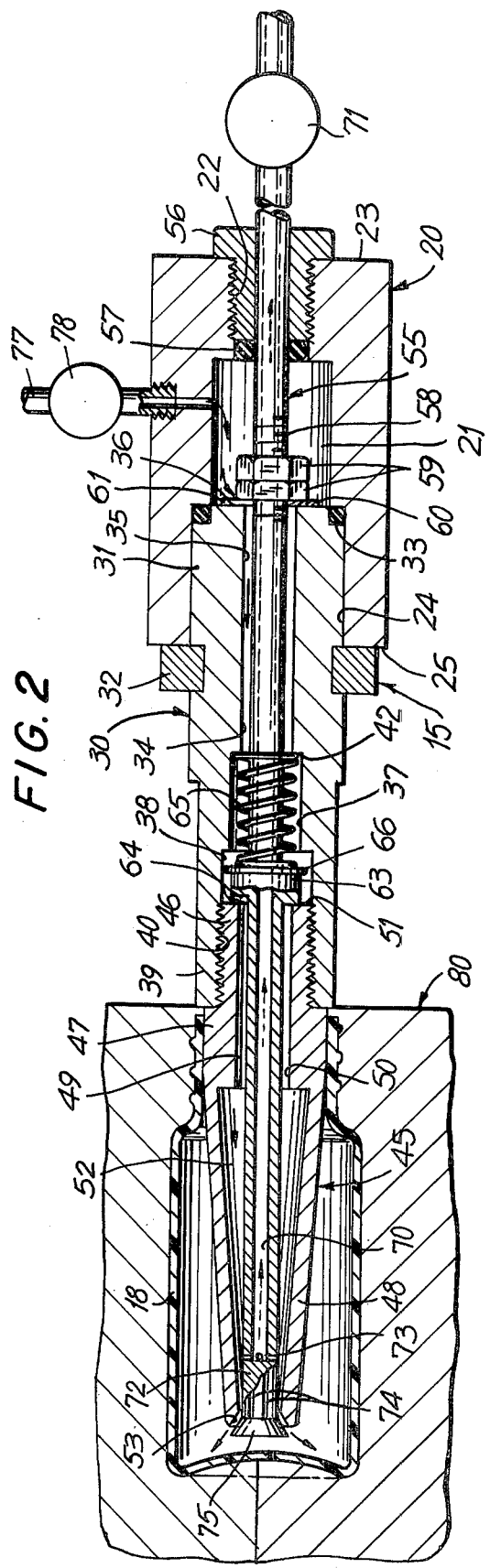

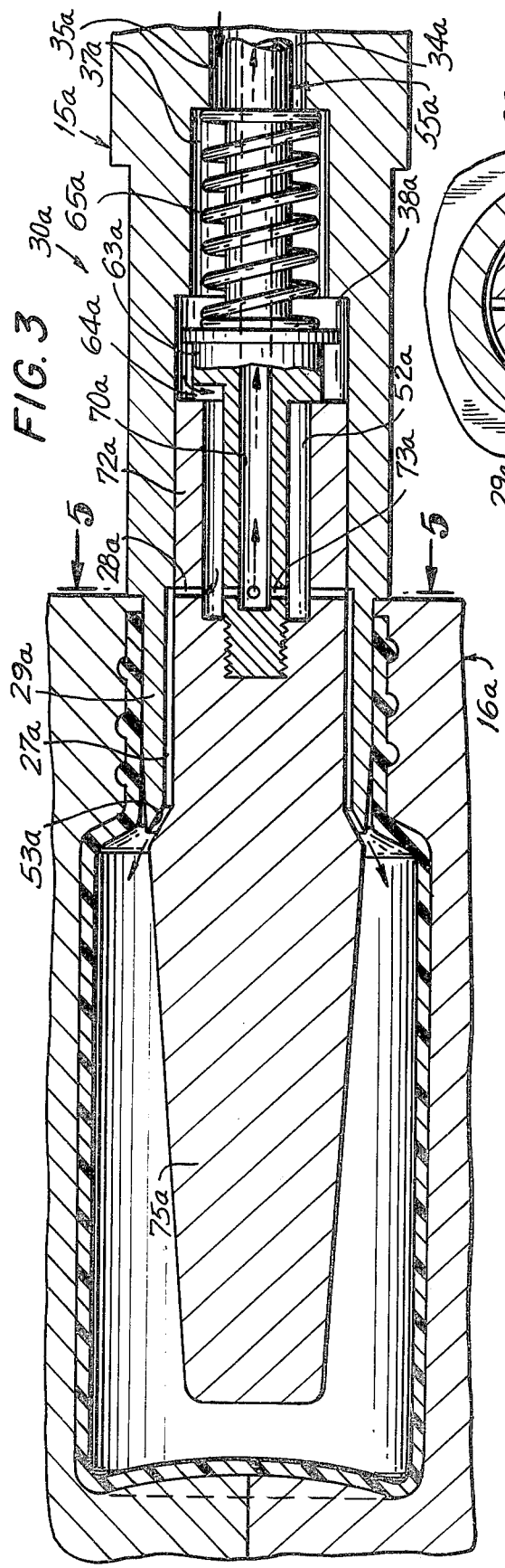
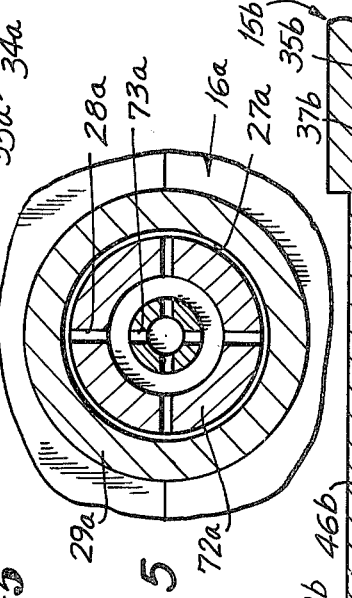
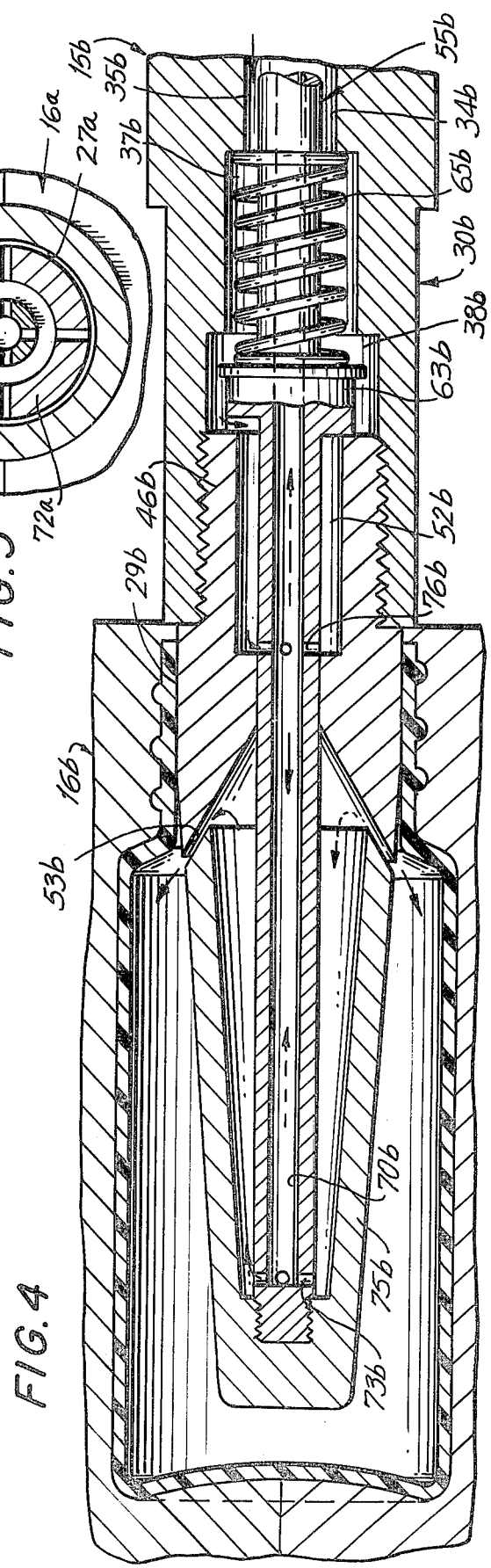
FIG. 3
FIG. 5
FIG. 4

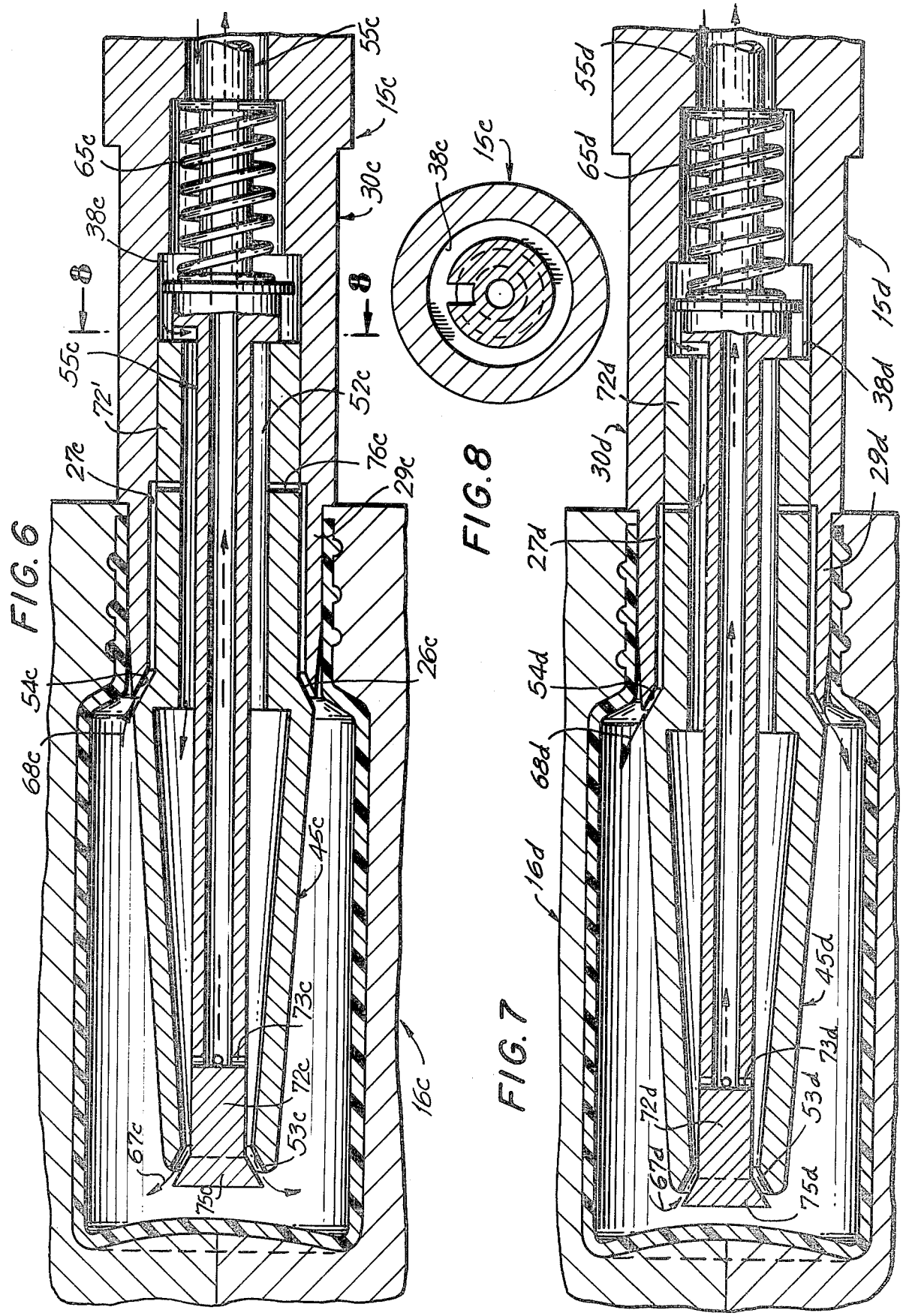

CORE ROD CONSTRUCTION FOR BLOW-MOLDING APPARATUS

This application is a continuation application of applicant's prior pending application Ser. No. 327,005; filed Jan. 26, 1973 now abandoned.

BACKGROUND OF THE INVENTION

In the prior art of blow molding, there have been proposed a wide variety of core rods for use in blow molding apparatus, such as that disclosed in the copending patent application filed Sept. 25, 1972, Ser. No. 291,651, entitled BLOW-MOLDING PLASTICIZING MANIFOLD. However, such blow cores or core rods have not been entirely satisfactory, often causing the entrapment of air in a parison, resulting in a defective product, sometimes causing overheating or burning of the product, or requiring excessive cooling time to retard output, and presenting other difficulties in practical usage.

SUMMARY OF THE INVENTION

It is, therefore, an important object of the present invention to provide a core rod construction which overcomes the above-mentioned difficulties, effectively excludes the entrapment of air in a formed parison, being highly versatile in temperature control to effect rapid or slow cooling of the product, as required to achieve maximum production speed, while minimizing rejects.

It is a further object of the present invention to provide a core rod construction having the advantageous characteristics mentioned in the preceding paragraph, which is extremely simple in structure for economy in manufacture, durable and reliable throughout a long useful life, and which is highly versatile for use in the blow molding of a wide variety of articles.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 1 is a longitudinal sectional view showing a core rod of the present invention in operative association with a parison mold.

FIG. 2 is a longitudinal sectional view showing the core rod of FIG. 1 in operative association with a blow mold.

FIG. 3 is a longitudinal sectional view similar to FIG. 2, but showing a slightly modified embodiment of core rod constructed in accordance with the teachings of the present invention.

FIG. 4 is a longitudinal sectional view similar to FIG. 3, but showing another slightly modified embodiment of the present invention.

FIG. 5 is a transverse sectional view taken generally along the line 5—5 of FIG. 3.

FIG. 6 is a longitudinal sectional view similar to FIGS. 2, 3 and 4, and showing a further modification of core rod in accordance with the instant invention.

FIG. 7 is a longitudinal sectional view similar to FIG. 6, but showing a slightly modified embodiment.

FIG. 8 is a transverse sectional view taken generally along the line 8—8 of FIG. 6.

DESCRIPTION OF THE PREFERRED EMBODIMENTS

Figure 9:
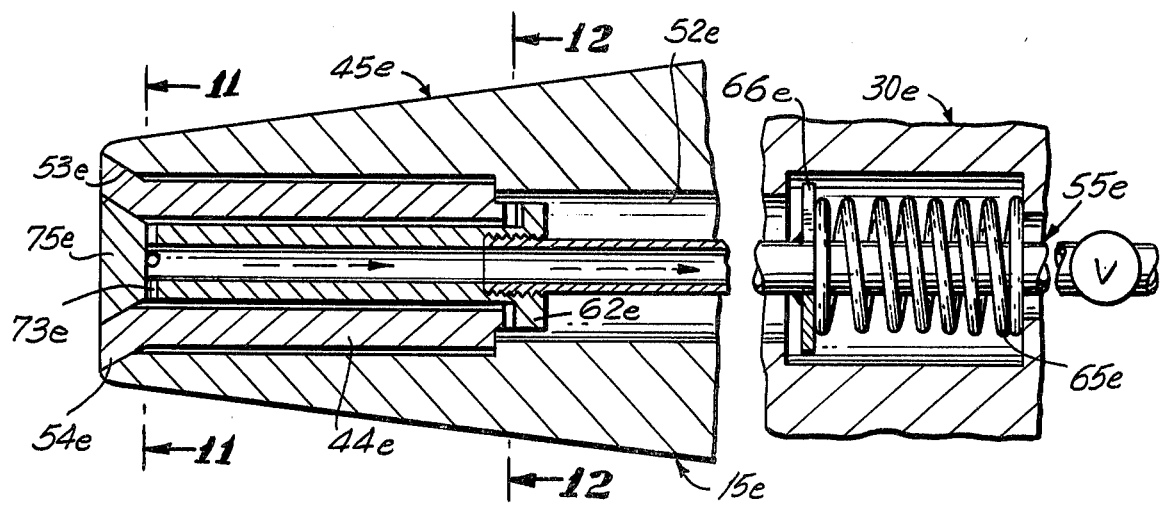
FIG. 9 is a longitudinal sectional view, partly broken away, showing still another embodiment of core rod of the present invention, in a closed or parison forming condition.

Referring now more particularly to the drawings, and specifically to FIGS. 1 and 2 thereof, a mounting block or body is generally designated 20, being suitably carried by and part of a blow-molding machine. The body or block 20 includes an interior hollow 21 which may be generally cylindrical, and coaxial with the body. A reduced internally threaded passageway 22 extends from one end of the hollow 21, opening through one end wall 23 of the body. Extending from the other end of the hollow 21 may be an enlarged bore 24 opening through the opposite body end 25.

A generally cylindrical or tubular, open ended mounting member or sleeve 30 has one end region 31 extending into the bore 24 of body 20, being secured therein by any suitable means, such as a retaining member 32. Suitable pneumatic sealing, as by an O-ring 33, or other sealing means may be employed to effectively seal the connection between sleeve end regions 31 and hollow body 20 in the bore 24.

The interior hollow 34 of sleeve 30 includes a generally cylindrical, coaxial portion or bore 35 extending inwardly from the sleeve end wall 36 of the end region 31, opening at its inner end into and enlarged, coaxial generally cylindrical passage portion 37, which opens in turn into a further enlarged passage portion or chamber 38. The chamber 38 extends through the opposite or distal end region 39 of the sleeve 30, being internally threaded, as at 40, and opening through the distal or remote sleeve end wall 41. The passage portion 35, at its junction with the larger passage portion 37 defines an internal annular shoulder 42 facing longitudinally outwardly or leftward in the illustrated embodiment. Similarly, the passage portion 37 combines at its outer end with the adjacent chamber 38 to define an internal annular shoulder 43, also facing longitudinally outwardly.

At the outer or distal end of the sleeve 30 there is provided a hollow parison forming member or extension 45, which may be of elongate configuration generally longitudinally or coaxially of the sleeve 30. More specifically, the parison forming extension 45 includes an externally threaded inner end region or nipple 46 threadedly engaged in the internal end region threads 40 of the sleeve 30, and an enlarged mid-region 47 in limiting abutment with the end surface 41 of the sleeve. An elongate frusto-conical distal end region 48 extends from mid-region 47 generally coaxially therewith. The extension 45 is internally hollow, as at 49, having its opposite ends open, so that an inner passage portion or bore 50 generally coaxially within the nipple 46 and mid-region 47 opens into the chamber 38. The end surface 51 of the nipple 46 defines an annular inwardly facing shoulder in chamber 38. The outer end of passage portion or bore 49 opens into an enlarged passage portion 52 of generally frusto-conical configuration, coaxial with the passage portion 49 and tapering outwardly away from the latter. The passage portion 52 is outwardly convergent or tapering to a juncture with a frusto-conical opening or hole 53 in the distal or terminal end region of the extension 45. That is, the end opening or hole 53 tapers outwardly or flares in the direction away from the passage portion 52, generally coaxially therewith. For purposes appearing more fully hereinafter the hole 53 effectively provides a valve seat.

Disposed longitudinally of and concentrically in spaced relation within the internally threaded region 22 and hollow 21 of body 20, and the hollow 34 of sleeve 30, and the hollow 49 of extension 45, is an elongate tubular member, conduit or stem 55. The stem 55 extends slidably through a centrally apertured bearing member or plug 56 which is externally threaded for engagement in the threaded body end opening 22. Suitable sealing means, as at 57 may be engaged about the stem 55 in the region 22 to provide a fluid-tight juncture. The stem 55 is located in spaced relation within the hollow or internal chamber 21, therebeing provided with suitable means, such as external screw threads 58 for retaining circumposed lock members or nuts 59. The lock members or nuts 59 serve to adjustably locate an annular stop member or washer 60 having a through opening, such as a radial slot 61. The stop member 60 thus limits permissible outward longitudinal shifting movement of the stem 55 by engagement with the sleeve end wall 36, while permitting of fluid communication between the hollow 21 and bore 35 when the stem is in its limiting position of movement.

The stem 55, at a location within the enlarged chamber 38, incldes an annular circumferential formation or collar 63 having a radial groove or slot 64 on its side adjacent to nipple end wall 51. Resilient means, say in the form of a coil compression spring 65, yieldably urges the stem 55 longitudinally outward or leftward. That is, the coil compression spring 65 is circumposed about the stem 55 within the passage portion 37. One spring end is in bearing engagement with the outwardly facing shoulder 42, and the other spring end may bear against a washer 66, which in turn bears against the enlargement or collar 63. Thus, the stem 55 is resiliently and yieldably urged longitudinally outwardly as limited by the adjustment of lock nuts 59 and washer 60, or the fixed outer limit defined by engagement of enlargement 63 with end wall 51.

The stem or conduit 55 is provided with a longitudinally extending, coaxial internal hollow or bore, as at 70. Externally of the mounting body 20, the conduit 55 may be provided with a valve 71 for admitting fluid under positive or negative pressure to or from the bore 70. The outermost or distal end of the stem 55 is provided with an end member or closure 72 configured for sliding engagement through the smaller dimension of opening or hole 53. The internal hollow or bore 70 of the stem 55 terminates at the end member or closure 72, and there may be provided a plurality of radial passageways or ports 73 proximate to the end member 72 communicating between the interior 70 of stem 55 and the passage portion or chamber 52. Further, the end member or closure 72 is advantageously provided with longitudinally extending, external grooves or flutes, as at 74 in FIG. 2, which provide metering passages as will appear more fully hereinafter.

On the distal or outer end of end member or closure 72 is provided a frusto-conical valve element or head 75 adapted to removably seat in conforming, closing relation within the opening or hole 53. That is, when the stem 55 is shifted inwardly or rightwardly, the head 75 seats in closing relation within the opening 53, and upon leftward or outward shifting movement of the stem the valve element or head opens with respect to the seat 53, the condition shown in FIG. 2.

A fluid pressure supply line or conduit 77 is connected to the body 20 for fluid communication between a fluid source and the interior hollow 21, and suitable valving means 78 may be provided in the conduit or supply line 77.

In the illustrated condition of FIG. 1, the core rod, generally designated 15, is located in operative association with a parison mold 16, the core rod extension 45 being located spacedly within the mold cavity and combining therewith to define the configuration of a parison 18. In particular, the mid-region 47 of extension 45 closes the opening of parison mold cavity 17, the sleeve end wall 41 abutting the parison mold 16 to properly position the extension 45 in the cavity, while fluent plastic is injected to form the parison 18.

In the parison forming condition shown in FIG. 1, the pressure of parison material 18 may be employed to retract the head 75 to its closed position against the force of resilient means 65. If desired, vacuum or negative pressure may be applied, as through one or both of the valves 71 and 78 to the hollow interiors of the chamber 52 and stem bore 70, so as to shift the stem while exhausting air from the parison cavity and maintain the head 75 closed.

Subsequent to the parison forming step of FIG. 1, the parison 18 on the extension 45, is located in the product forming cavity of a blowing mold 80, as in FIG. 2. In this operative association, suitable fluid, such as air, is applied to the interior of the core rod 15 to open the valve 75 and dispense the air between the valve and seat 53 for expanding or blowing the parison to assume the configuration of the mold. In one mode of operation, as shown in FIG. 2, the valve 78 may be open for communication with a source of fluid under pressure, which fluid moves in the direction of the solid arrows for expanding the parison 18 and simultaneously cooling the core rod and the expanded article. If desired, the fluid may be simultaneously exhausted, as through stem bore 70 and valve 71. The selective communication of conduits 77 and 55 through respective valves 78 and 71 with sources of fluid pressure and/or vacuum may be suitably controlled, as by electrical or mechanical means, either automatically or manually. However, the advantageous application of vacuum to effectively remove all entrapped air in the formation of a parison, while permitting of desired cooling during and subsequent to blowing may be conveniently achieved.

Referring now to the embodiment of FIG. 3, wherein a rod core is generally designated 15a, an open-ended sleeve 30a may be fixed at one end to a body, such as the body 20 of the first described embodiment. The sleeve 30a includes a longitudinally extending central bore or passage 34a similar to the passage 34, including a passage portion 35a which opens into an enlarged passage portion 37a, which in turn opens into a further enlarged passage portion or chamber 38a. The sleeve 30a extends into abutting engagement with the mold 16a, and is provided with a generally cylindrical terminal portion endpiece or cuff 29a extending into the cavity of mold 16a, about the opening thereof.

Disposed longitudinally in the passage 34a of sleeve 30a is a tubular conduit or stem 55a, which is provided with a circumferential collar or enlargement 63a located in the chamber 38a. As in the first described embodiment, the stem 55a is longitudinally shiftable in the passage 34a, and resilient means 65a may yieldably urge the stem longitudinally outward into a limiting position, such as is illustrated.

An elongate head 75a is located in spaced relation within the cuff 29a, projecting outwardly therefrom into the cavity of mold 16a. The inner end of head 75a is provided with a closure or shank 72a slidably received in the chamber 38a and having a central internal cavity, hole or chamber 52a opening inwardly into the enlarged chamber 38a. The distal or outer end of tubular stem 55a extends in spaced relation concentrically into the chamber 52a, and is threadedly secured to the head 75a.

The hollow interior 70a of conduit or stem 55a may communicate with a plurality of radial ports 73a with the chamber 52a, and thence through additional radial ports 28a to the annular space 27a between the cuff 29a and spacedly received adjacent region of head 75a.

It will appear that the distal end of sleeve addition or cuff 29a is provided with an internal frusto-conical surface 53a defining a valve seat, while the adjacent external surface of the head 75a is conformably frusto-conical for displaceable seating engagement with the valve seat.

In the illustrated condition of FIG. 3, the stem 55a and the associated heads 75a are shifted leftward or outward to the open position, so that fluid under pressure may pass, say in the direction of the solid arrows, through the passage 34a, the notch or groove 64a of collar 63a, ports 28a and space 27a into the molding cavity for blowing and cooling the molded product. If desired, gases may simultaneously or sequentially exhaust, say through the interior of stem 55a, or otherwise, as desired.

Upon shifting of the stem 55a rightward, the heads 75a will engage in closing relation with the valve seat 53a, so that the head effectively serves as a valve element. Further, the head 55a may combine with the annular addition or cuff 29a to define a parison forming extension on the sleeve 30a for use in a parison forming mold. As in the first described embodiment, vacuum may be applied interior of the sleeve 30a to minimize or eliminate air entrapment in the parison and maintain the head 75a closed.

In the embodiment of FIG. 4, there is shown a further modification of core rod 15b wherein a sleeve 30b may be employed which is substantially identical to the sleeve 30, including a central passageway 34b having a portion 35b opening into an enlarged passage portion 37b which in turn opens into a further enlarged chamber 38b. An elongate, centrally hollow sleeve addition 29b projects from the sleeve 30b for extension into the cavity opening of a mold 16b. The addition 29b is fixed to the sleeve 30b by a nipple 46b extending in threaded engagement into the adjacent end of the sleeve 30b. The nipple 46b is provided with an internal hollow or recess 52b opening into the chamber 38b, and an outer end recess or cavity having a frusto-conical internal surface 53b.

An elongate tubular conduit or hollow stem 55b is located in the passageway 34b, including an enlargement or collar 63b in the chamber 38b. The stem extends slidably through and outwardly beyond the sleeve addition 29b, being provided on its outer end with a hollow enlargement or head 75b. The head 75b is shiftable with the stem 55b between the open illustrated position and a retracted closed position with the head in conforming engagement with the sealing surface or seat 53b.

There may be provided radial ports through the stem 55b, as at 73b interiorly of the head 75b, and at 76b interiorly of the hollow 52b. Thus, pressurized fluid or air may be introduced exteriorly of the stem 55b into the passage 34b, entering the stem through ports 76b, and leaving the stem through ports 73b for cooling and blowing action into the cavity of blow mold 16b. Suitable venting or exhaust, may be provided, as desired.

It will also be appreciated that the sleeve addition or cuff 29b combines with the head 75b when the latter is shifted rightward to its closed or retracted position to define a parison forming extension on the sleeve 30b for effective operation in a parison forming mold, as in the previously described embodiments.

A still further embodiment of core rod is shown in FIGS. 6 and 8, there being generally designated 15c and including a sleeve 30c which may be substantially identical to the sleeve 30a of FIG. 3. A parison-forming extension 45c projects from the circumferential cuff or sleeve addition 29c, and a tubular plug portion 72′ of the extension 45c is slidably received in the enlarged chamber 38c of sleeve 30c. The plug 72′ is internally hollow, as at 52c, which hollow surrounds the stem 55c, opening at its inner end to the chamber 38c and its outer end through the outer end of the extension 45c.

The circumferential sleeve addition or cuff 29c is provided on its outer end with an internal frusto-conical surface or valve seat 54c, and the extension 45c is provided with an external frusto-conical formation 26c for seating engagement with the seat 54c. Further, the distal or remote end of the extension 45c is formed with an opening having an internal frusto-conical surface or valve seat 53c.

The tubular conduit or stem 55c extends spacedly entirely through the extension 45c terminating in an end closure 72c and provided on the distal end thereof with a frusto-conical head or valve element 75c.

There may be provided radial ports, as at 76c formed in the inner plug region of extension 45c communicating between the hollow 52c and the space 27c between the extension and surrounding cuff 29c so as to pass air when the extension is shifted leftward to an extended position. Additionally, the conduit or stem 55c may be provided with radial ports 73c proximate to the end closure 72c for communication with the space 52c and passage of air outwardly through the opening 53c when the stem is extended to its open position.

By this construction it will be apparent that there are provided flows of air at different locations within the article in the mold cavity 16c, as for additional cooling of the core rod and the article or greater circulation as may be desirable when blowing a larger thick-walled container.

As illustrated in the embodiment of FIG. 6, fluid for blowing the article and cooling the article or the core rod may enter the parison, as at arrows 67c adjacent to the bottom of the mold cavity, and exhaust, as at arrows 68c adjacent to the cavity opening or neck portion of the article.

The embodiment shown in FIG. 7 may be essentially identical to that shown in FIGS. 6 and 8, being generally designated 15d, including a sleeve 30d, and both longitudinally shiftable extension 45d and longitudinally shiftable head 75d. However, as shown in FIG. 7, valving may be arranged to reverse the direction of fluid flow, say passing inwardly, as at arrows 67d adjacent to the mold opening or neck, and exiting at arrows 68d adjacent to the inner end or bottom of the cavity of mold 16d.

Considering now the additional embodiment of FIGS. 9–12, a sleeve is there generally designated 30e, having extending longitudinally therethrough a longitudinally shiftable tubular conduit or stem 55e. A sleeve extension is provided at 45e and includes a through hollow or cavity 52e terminating at the outer extension end in an opening 53e bounded by a frusto-conical internal surface. The longitudinally shiftable stem 55e carries on its distal end a frusto-conical head 75e in closing relation with the stem. There may be provided, inward of the closure head 75e, a plurality of radial ports 73e formed in the tubular stem 55e. Spaced inward from the head 75e, there may be provided about the stem 55e a circumferential enlargement or head 62e.

A tubular intermediate head section 44e may be slidably circumposed about the conduit or stem 55e intermediate the enlargement 62e and head 75e. The intermediate tubular member 44e is of a length slightly less than the distance between the enlargement 62e and head 75e permitting of limited longitudinal shifting of the section 44e. Further, the section 44e has an end portion 54e configured for conforming seating engagement with both the external surface of frusto-conical head 75e and the internal frusto-conical surface of valve seat 53e. Thus, the end portion 54e may be considered as a head section, as will appear presently.

In the illustrated condition of FIG. 9, the central head 75e is seated in closing relation with the intermediate head section 54e, and the latter is seated in closing relation with the valve seat 53e, so that the interior of the extension 45e is closed, as for forming of a parison. Such closure may be mechanically effected by the force of the parison material, or may be produced by negative pressure in the parison forming extension.

Figure 10:
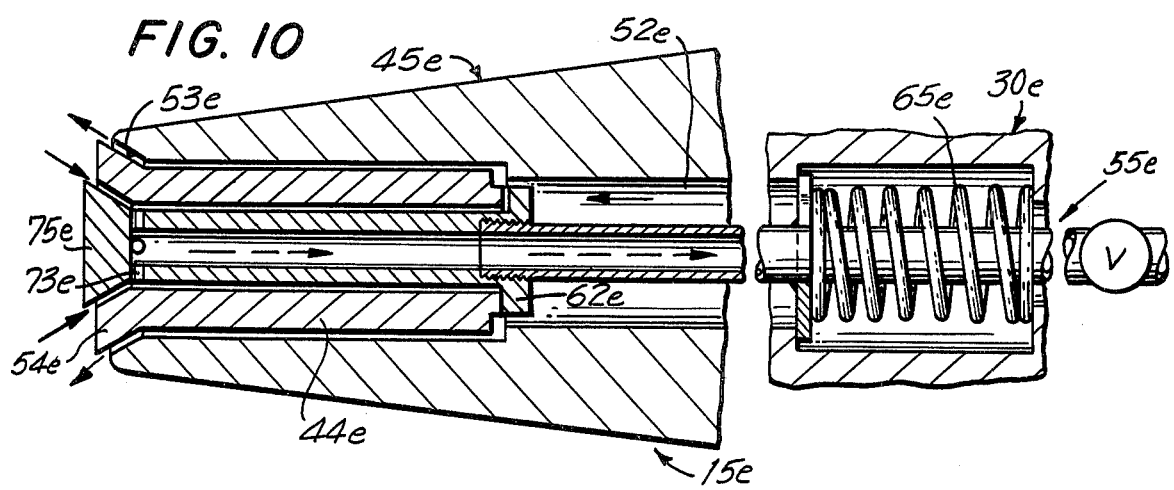
FIG. 10 is a longitudinal sectional view similar to FIG. 9 showing the core rod in an open blowing condition.
Figure 11:
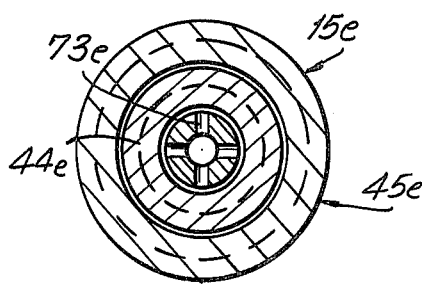
FIG. 11 is a transverse sectional view taken generally along the line 11—11 of FIG. 9.
Figure 12:
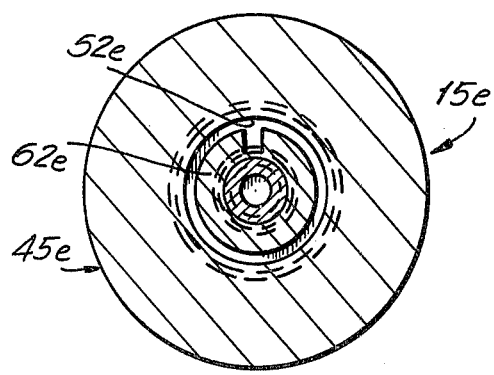
FIG. 12 is a transverse sectional view taken generally along the line 12—12 of FIG. 9.

In the condition shown in FIG. 10, the core rod 15e is illustrated as in its blowing condition, the resilient means 65e urging the stem 55e longitudinally leftward or outward, and the enlargement or shoulder 62e shifting the intermediate section 44e to an intermediate open or extended position. It will there be appreciated that there are afforded openings between the intermediate head section 54e and both the valve seat 53e and central head sections 75e. This construction also affords a relatively greater discharge of cooling and blowing air, when desirable, and locates the air at the lower or bottom region of the mold, as may be required under certain circumstances.

From the foregoing, it is seen that the present invention provides a core rod construction which is highly versatile in operative conditions of use, simple in structure for economy in manufacture, and durable and reliable throughout a long useful life.

Although the present invention has been described in some detail by way of illustration and example for purposes of clarity of understanding, it is understood that certain changes and modifications may be made within the spirit of the invention.

What is claimed is:

1. A core rod construction, for use with a mold, of a generally elongate and longitudinal configuration for blow-molding apparatus comprising:

an open ended hollow mounted sleeve;

a hollow parison forming extension provided at an outer end of said sleeve, said extension having a hollow passage portion, said extension being in a spaced location from side walls of said mold, said extension having an elongated distal end region of generally frusto-conical configuration, said end region having a hollow passage portion tapering outwardly and forming a substantially axially directed, internally disposed frusto-conical opening at the end thereof;

an elongate tubular stem internally and shiftably disposed longitudinally and concentrically in spaced relation with said sleeve and said extension, an intermediate frusto-conical valve head, having a substantially axially directed, internally disposed frusto-conical opening and a substantially axially directed, externally disposed frusto-conical surface, slideably received on said stem, said externally disposed frusto-conical surface of said intermediate valve head removably sitting in said internally disposed frusto-conical opening at the end of said extension, said stem having a frusto-conical valve head with a substantially axially directed frusto-conical surface at the distal end thereof and being movably received in the internally disposed frusto-conical opening of said intermediate valve head such that when said stem is shifted in a direction opposite from said distal end of said extension, said valve head sits in closing relation with both of said frusto-conical openings, and when said stem is shifted in a direction toward said distal end of said extension, said valve head of said stem opens with respect to said frusto-conical openings and annular spacings through which gases may pass are formed therebetween, said stem having a hollow passage portion and a plurality of radial passages at the distal end thereof closer in than said head, said radial passages enabling communication between said hollow passage portions of said extension and said hollow passage portion of said stem, a gas adapted to pass from said hollow passage portion of said stem into said hollow passage portions of said extension into a parison to be formed on said extension via said passages at the distal end of said stem and said annular spacings when said heads are open with respect to said frusto-conical openings;

a gas pressure source communicating with a hollow passage portion of said extension and with said hollow passage portion of said stem, a resilient means operatively associated with said stem to urge said distal end of said stem towards the position where said head of said stem is open with respect to said frusto-conical openings, so that the gas flowing into said parison to be formed will expand said parison, means to shift said stem against said resilient means to close said head with respect to said frusto-conical openings, such that the gas from a cavity formed by expanding the parison is expelled axially through said hollow passage portion of said stem, whereby a greater discharge of cooling and blowing air is achieved at the lower or bottom region of said mold.

2. A core rod construction according to claim 1, including a remote end of said sleeve extending in said mold and terminating short of said head of said stem for discharge of gas proximate to said mold.

3. A core rod construction according to claim 1, said hollow extension being elongate longitudinally of said hollow sleeve, and said sleeve and said extension having their hollow passage portions axially aligned.

4. A core rod construction according to claim 1, said heads having longitudinally extending gas passageways serving to effectively meter gas flow.

* * * * *

UNITED STATES PATENT OFFICE
CERTIFICATE OF CORRECTION

PATENT NO. : 4,150,689

DATED : April 24, 1979

INVENTOR(S) : George C. Britten

It is certified that error appears in the above-identified patent and that said Letters Patent are hereby corrected as shown below:

[73] ASSIGNEE: Manbritt Industries, Inc.
Amityville, New York

Signed and Sealed this

Thirteenth Day of January 1981

[SEAL]

Attest:

SIDNEY A. DIAMOND

Attesting Officer  Commissioner of Patents and Trademarks